June 19, 1934.  B. J. UKROPINA  1,963,512
REENFORCED CONCRETE PIPE JOINT
Filed May 2, 1933  2 Sheets-Sheet 1
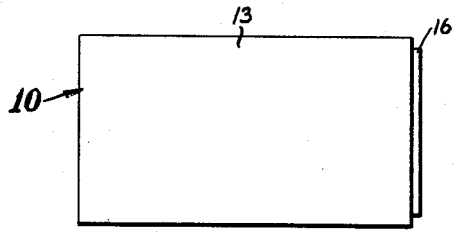
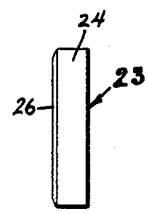
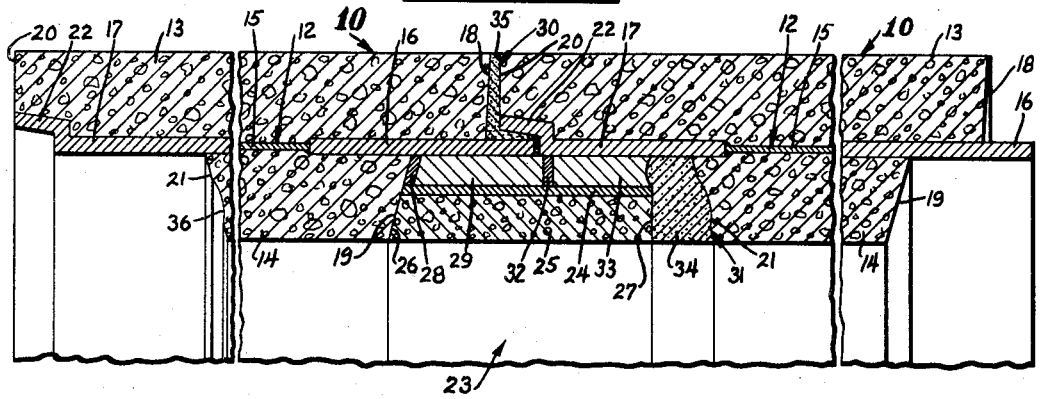
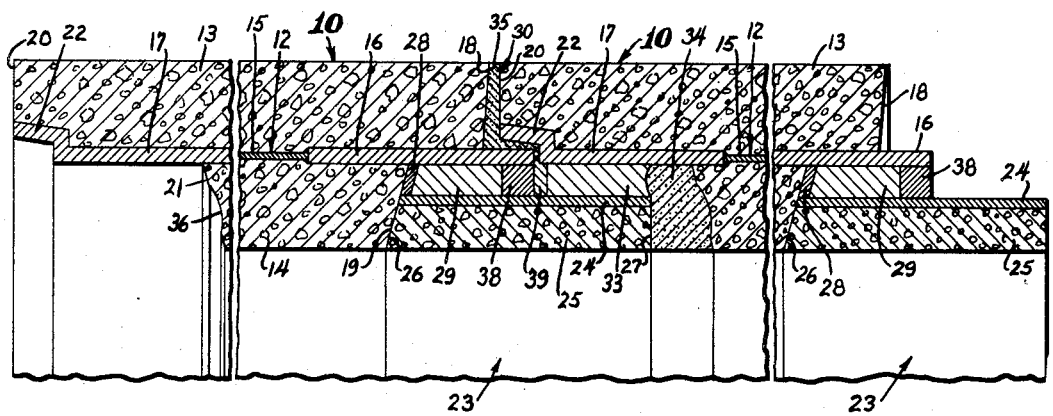
INVENTOR.
B. J. UKROPINA.
BY
ATTORNEY.

June 19, 1934.  B. J. UKROPINA  1,963,512
REENFORCED CONCRETE PIPE JOINT
Filed May 2, 1933  2 Sheets-Sheet 2
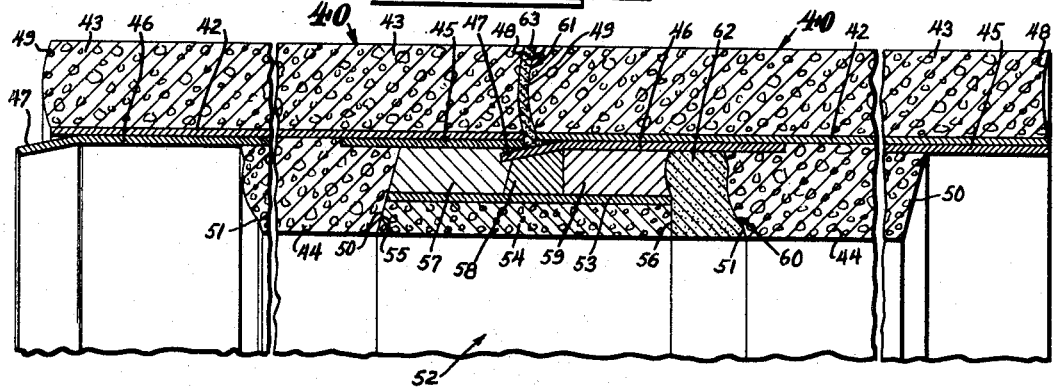
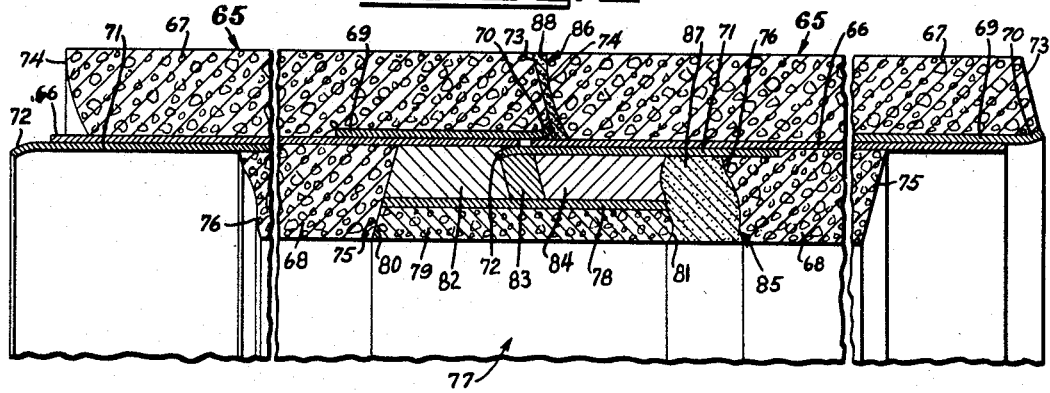
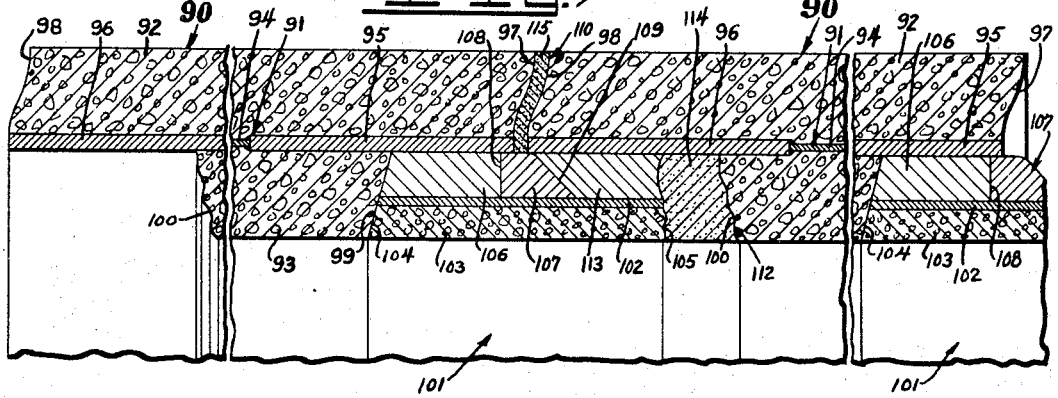
INVENTOR.
B. J. UKROPINA.
BY
ATTORNEY Patented June 19, 1934

1,963,512

UNITED STATES PATENT OFFICE 1,963,512

REENFORCED CONCRETE PIPE JOINT

Bozidar J. Ukropina, Los Angeles, Calif.

Application May 2, 1933, Serial No. 668,970

5 Claims. (Cl. 72—53)

This invention relates to improvements in concrete pipes.

The general object of the invention is to provide an improved concrete pipe joint construction.

Another object of the invention is to provide a concrete pipe joint wherein the joint is made leak-proof by novel means.

A further object of the invention is to provide a novel concrete pipe joint including a plurality of surfaces on which the pipe lengths slide in expanding and contracting.

Other objects and the advantages of this invention will be apparent from the following description taken in connection with the accompanying drawings wherein:

Fig. 1 is a side elevation of a concrete pipe embodying the features of my invention;

Fig. 2 is a side elevation of the collar used in forming my improved joint;

Fig. 3 is an enlarged fragmentary longitudinal section through two lengths of pipe showing my improved joint construction;

Fig. 4 is a view similar to Fig. 2 showing a slight modification of the joint construction;

Fig. 5 is a view similar to Fig. 3 showing a modified form of pipe having inside pipe centering means;

Fig. 6 is a view similar to Fig. 3 showing a modified form of pipe having inside and outside pipe centering means; and Fig. 7 is a view similar to Fig. 3 showing a modified form of inside pipe centering means.

Referring to the drawings by reference characters I have indicated a length of concrete pipe embodying the features of my invention generally at 10. As shown the pipe 10 includes a metal reenforcing tube 12 embedded between an outer layer of concrete 13 and an inner layer of concrete 14.

The tube 12 comprises an intermediate section 15 having end sections 16 and 17 of heavier material butt welded thereto to form a spigot ring and a bell ring respectively. The outer layer of concrete 13 adjacent the spigot ring 16 is set back from the outer end of the spigot ring as indicated at 18 and the inner layer of concrete 14 adjacent the spigot ring is set back from the outer end of the spigot ring beyond the end of the outer layer of concrete as indicated at 19. The end surface 19 is preferably coated with a water-proof paint. The outer layer of concrete 13 adjacent the bell ring terminates flush with the bell ring as indicated at 20 while the inner layer of concrete 14 is set back from the outer end of the bell ring as indicated at 21. Adjacent its outer end the bell ring 17 flares outwardly as indicated at 22 to receive the spigot end of another pipe.

In forming my improved joint I use a collar member 23 which is shown in detail in Fig. 2. As shown the collar 23 comprises an outer metal band 24 having a concrete ring 25 cast therein. The external diameter of the collar 23 is less than the internal diameter of the spigot and bell rings and the internal diameter of the collar corresponds to the internal diameter of the pipes with which it is associated. As shown one end face of the collar 23 is beveled as indicated at 26 and the opposite face is plane as indicated at 27. The end faces 26 and 27 of the collar are preferably coated with a water-proof paint.

In forming my improved joint the collar 23 is positioned in the spigot end of a pipe 10 with the end face 26 of the collar abutting the face 19 of the pipe. When the collar 23 is thus positioned in a section of pipe, a portion of the collar projects beyond the end of the pipe and a space is left between the outer surface of the collar and the inner surface of the spigot ring. A ring of packing material 28, such as hemp is positioned against the face 19 of the pipe in the space between the inner surface of the spigot ring and the outer surface of the collar. Thereafter a caulking material 29, such as lead wool, is driven in the remaining space between the collar and spigot ring.

The bell end of a pipe to be joined to the first pipe is then positioned over the projecting portion of the collar. When two sections of pipe are in this position a chamber 30 is left between the ends 18 and 20 of the outer layers of concrete and a chamber 31 is left between the end 21 of the inner layer of concrete and the end 27 of the collar. A ring of packing material 32 such as hemp is positioned against the outer end of the caulking 29 and then a caulking material 33, such as lead wool, is positioned in the space between the inner surface of the bell ring and the outer surface of the collar and between the felt packing 32 and the end 27 of the collar. Thereafter, the chamber 31 is filled with a plastic material 34 such as a cement mortar and the chamber 30 is filled with a plastic material such as asphaltum.

The metal band 24 of the collar 23 is preferably made of material of less thickness than the thickness of the spigot and bell rings so that when the pressure in the pipes increases to an excessive degree the collar 23 will expand before the bell and spigot portion of the pipe whereupon the caulking and packing material of the joints will be more tightly compressed thereby forming a more leak-proof joint.

The ends 18 and 20 of the outer layers of concrete 13 are preferably shaped to form the chamber 30 in a shape which will prevent accidental dislodgement of the filling material 35. The end 21 of the inner layer of concrete 14 is shown as including a configuration such as indicated at 36 which forms chamber 31 in a shape which will prevent accidental dislodgment of the filling material 34.

When the pipe line expands or contracts the spigot rings of the pipes may slip on the outer surfaces of their associated caulking materials 29 and the bell rings of the pipes may slip on the outer surfaces of their associated caulking materials 33.

By coating the pipe surfaces 19 and the collar surfaces 26 with a water-proof paint the collars do not adhere to their associated pipes and by similarly coating the ends 27 of the collars they do not adhere to their associated filling materials 34. So therefore the pipe sections move independently of the collars. Thus the caulking materials may also slip on the metal bands of the collars.

In Fig. 4 I have shown a slightly modified form of joint. In this modification the collar 23, the hemp packing 28 and the caulking 29 are positioned in the spigot end of the pipe 10 at the place of manufacture. The outer end of the caulking material 29 is spaced from the end of the spigot ring and a preformed ring member 38 is positioned on the collar between the outer surface thereof and the inner surface of the spigot ring and between the end of the caulking 29 and the end of the spigot ring. The ring member 38 may be made of metal or concrete or other suitable material. When one section of pipe is joined to another as previously described a packing material 39 such as a hemp ring is preferably positioned against the outer face of the ring member 38 and then the caulking material 33 is placed in position. Thereafter, the filling materials 34 and 35 are placed in the chambers 30 and 31 as previously described.

In Fig. 5 I have indicated a modified form of pipe construction generally at 40. As shown the pipe 40 includes a metal tube 42 embedded between an outer layer of concrete 43 and an inner layer of concrete 44. The tube 42 at one end has a metal reenforcing band 45 therein which is secured thereto by welding and at the opposite end the tube 42 has a metal reenforcing band 46 therein which is similarly secured thereto. The outer end of the band 46 is tapered inwardly as indicated at 47 and extends beyond the end of the tube 42. The outer layer of concrete 43 at each end terminates flush with the ends of the tube 42 as indicated at 48 and 49, while the inner layer of concrete 44 at each end is set back from the adjacent ends of the tube as indicated at 50 and 51. The end 50 of the inner layer of concrete is preferably beveled and coated with a suitable water-proof paint.

In forming a joint between two sections of the pipe 40 a collar 52 similar to the collar 23 is used. The collar 52 like the collar 23 comprises an outer metal band 53 having a concrete ring 54 cast therein. The external diameter of the collar 52 is less than the internal diameter of the pipe bands 45 and 46 and the internal diameter corresponds to the internal diameter of the pipes with which it is used. As shown one end face of the collar 52 is beveled as indicated at 55 and the opposite face thereof is plane as indicated at 56. Both end faces 55 and 56 of the collar 52 are preferably coated with a suitable water-proof paint.

In forming a joint between two sections of the pipes 40 the collar 52 is positioned in the end of one of the pipes adjacent the band 45 with the end face 55 of the collar abutting the end 50 of the pipe. When the collar 52 is thus positioned in the pipe a portion of the collar projects beyond the end of the pipe and a space is left between the outer surface of the collar and the inner surface of the pipe band 45. Caulking material 57, such as lead wool, is then driven in the space between the outer surface of the collar and the inner surface of the pipe band 45. The tapered end 47 of the pipe to be joined to the first pipe is then positioned over the projecting portion of the collar with the outer end of the tapered portion entering the band 45 of the first pipe. As shown the tapered end 47 of the reenforcing band 46 of the second pipe enters the reenforcing band 45 of the first pipe to correctly align the two pipes.

A packing ring 58 is then positioned over the collar 52 and positioned adjacent the outer end of the band 46. The packing ring 58 may be formed to shape before being positioned on the collar or it may be formed on the collar at the time of forming the joint. A caulking material 59 such as lead wool is then driven into the space between the outer surface of the collar and the inner surface of the pipe band 46. As the caulking material 59 is driven into place the tapered end 47 of the pipe band 46 is driven into the caulking material 57. When the two sections of pipe are thus joined a chamber 60 is left between the end 51 of the inner layer of concrete 44 of the pipe and the end 56 of the collar and a chamber 61 is left between the ends 48 and 49 of the outer layers of concrete 43 of the pipe. After the caulking 59 is placed in position the chamber 60 is filled with a plastic material 62 such as cement mortar and the chamber 61 is filled with a plastic material 63 such as asphaltum.

The metal band 53 of the collar 52 is preferably of less thickness than the combined thickness of the pipe tube 42 and its associated reenforcing bands 45 and 46 so that when the pressure in the pipes increases to an excessive degree the collar 52 will expand before the pipe ends whereupon the packing and caulking material will be more tightly compressed thereby making the joint more leak-proof.

In Fig. 6 I have indicated another modified form of pipe construction generally at 65. As shown the pipe 65 includes a metal reenforcing tube 66 embedded between an outer layer of concrete 67 and an inner layer of concrete 68. The tube 66 at one end has a metal bell ring 69 positioned thereover and secured thereto by welding. The outer end of the bell ring 69 projects beyond the end of the reenforcing tube 66 and is flared outwardly as indicated at 70. At the opposite end the reenforcing tube 66 has a metal spigot ring 71 positioned therein and secured thereto by welding. The outer end of the spigot ring projects beyond the end of the tube 66 and curves inwardly as indicated at 72. The outer layer of concrete 67 adjacent the bell ring terminates flush with the outer end of the bell ring as indicated at 73 while the opposite end of the outer layer of concrete is set back slightly from the adjacent end of the tube 66, as indicated at 74. The end of the inner layer of concrete 68 adjacent the end of the tube 66 as indicated at 75 is tapered and preferably coated with a waterproof paint. The opposite end of the inner layer of concrete is likewise set back from the outer end of the spigot ring as indicated at 76.

In forming a joint between two sections of the pipe 65, a collar member 77 similar to the collar 23 is used. The collar 77 comprises an outer metal band 78 having a concrete ring 79 cast therein. The external diameter of the collar 77 is less than the internal diameter of the pipe tubes and the spigot ring and the internal diameter of the collar corresponds to the internal diameter of the pipes with which it is associated. As shown one end face of the collar 77 is beveled as indicated at 80 and the opposite face thereof is arcuate as indicated at 81. Both end faces 80 and 81 of the collar are preferably coated with a water-proof paint.

In joining two sections of pipes 65, the collar 77 is positioned in the bell ring end of one pipe with the end 80 of the collar abutting the end 75 of the inner layer of concrete 68. When the collar is thus positioned in the pipe a portion of the collar projects beyond the outer end of the bell ring and a space is left between the outer surface of the collar and the inner surface of the reenforcing tube 66. Caulking material 82 such as lead wool is then driven into the space between the collar band 78 and the pipe tube 66. The spigot end of the pipe to be joined to the first pipe is then inserted into the tube 66 of the first pipe at the bell end. As the two pipes are thus placed into position the projecting portion 72 of the spigot ring of the second pipe engages the inner surface of the tube 66 of the first pipe and the projecting portion 70 of the bell ring of the first pipe engages the outer surface of the tube 66 of the second pipe. As the two sections of pipe are moved together the flared portion 70 of the bell ring and the flared portion 72 of the spigot ring correctly align the two pipe sections. A packing ring 83 similar to the packing ring 58 in Fig. 5 is then positioned over the collar 77 and positioned adjacent the outer end of the spigot ring 71 of the second pipe. The packing ring 83 like the packing ring 58 may be formed before being positioned in place or it may be formed on the collar at the time of forming the joint. A caulking material 84 such as lead wool is then driven into the space between the collar 77 and the spigot ring 71 of the second pipe. As the caulking material 84 is driven into place the outer end of the spigot ring is driven tightly into the caulking material 82.

When two sections of the pipe are thus joined a chamber 85 is left between the end 75 of the inner layer of concrete 68 of the second pipe and the end 81 of the collar 77 and a chamber 86 is left between the adjacent ends 73 and 74 of the outer layers of concrete 67 of the two pipes. After the caulking material 84 is placed in position the chamber 85 is filled with a plastic material 87 such as cement mortar and the chamber 86 is filled with a plastic material such as asphaltum.

The metal band 78 of the collar 77 is of less thickness than the combined thickness of the pipe tube 66 and its associated bell and spigot rings so that when the pressure in the pipes increases to an excessive degree the collar 77 will expand before the pipe ends whereupon the packing and caulking materials will be more tightly compressed thereby making the joint more leak-proof.

In Fig. 7 I have indicated a further modified form of pipe construction generally at 90. As shown the pipe 90 includes a metal reenforcing tube 91 embedded between an outer layer of concrete 92 and an inner layer of concrete 93. The reenforcing tube 91 comprises an intermediate section 94 having end sections 95 and 96 of heavier material butt welded thereto. The outer layer of concrete 92 at each end terminates flush with the outer ends of the end sections 95 and 96 as indicated at 97 and 98. The end of the inner layer of concrete 93 adjacent the end section 95 is set back from the outer end of the member 95 as indicated at 99 and is tapered and preferably coated with a suitable water-proof paint. The opposite end of the inner layer of concrete is likewise set back from the outer end of the end section 96 as indicated at 100.

In forming a joint between two sections of the pipe 90 a collar member 101 similar to the collar 23 is used. The collar 101 comprises a metal band 102 having a concrete ring 103 cast therein. The external diameter of the collar 101 is less than the internal diameter of the end sections 95 and 96 and the internal diameter of the collar corresponds to the internal diameter of the pipes with which the collar is used. As shown one end face of the collar is beveled as indicated at 104 and the opposite end face thereof is corrugated as indicated at 105. Both end faces 104 and 105 of the collar are preferably coated with a water-proof paint. With this pipe construction the collar 101 is preferably placed in position in one section of pipe and half of the joint caulking material is placed in position at the place of manufacture. The collar 101 is placed in a pipe with the end 104 of the collar abutting the end 99 of the inner layer of concrete of the pipe. When the collar is thus positioned in the pipe a portion of the collar projects beyond the end of the pipe and a space is left between the outer surface of the collar and the inner surface of the end section 95 in which a caulking material 106 such as lead wool is positioned. A preformed centering ring member 107 is then positioned on the collar band 102. The centering ring 107 may be made of metal, concrete or other suitable material and includes a plane face 108 and an inclined face 109. The centering ring 107 is positioned on the collar with its plane face engaging the caulking material 106 and positioned inward from the outer end of the end section 75.

When laying sections of the pipe 90 the end section 96 of a pipe being joined to another is positioned about the collar 101 and moved towards the first pipe. As the second pipe is moved towards the first the beveled face 109 of the centering ring 107 correctly aligns the two pipe sections. The second pipe is moved toward the first until only a small chamber 110 is left between the ends 97 and 98 of the outer layers of concrete. When two sections of the pipe are thus positioned together a chamber 112 is left between the end 105 of the collar and the end 100 of the inner layer of concrete of the second pipe. After the second pipe is placed in position a caulking material 113 such as lead wool is driven into place between the outer surface of the collar and the inner surface of the end section 96 of the second pipe. Thereafter, the chamber 112 is filled with a plastic material 114, such as cement mortar and the chamber 110 is filled with a plastic material such as asphaltum 115.

The metal band 102 of the collar 101 is of less thickness than the thickness of the metal end sections 95 and 96 of the pipe so that when the pressure in the pipes is increased to an excessive degree the collar 101 will expand before the pipe ends whereupon the caulking material will be more tightly compressed thereby making the joint more leak-proof.

From the foregoing description it will be apparent that I have provided an improved concrete pipe and pipe joint which can be economically manufactured and which is simple in construction and highly efficient in use.

Having thus described my invention, I claim:

1. A conduit including two pipes positioned end to end, each of said pipes including a metal reenforcing member embedded between an outer layer of molded material and an inner layer of molded material, said reenforcing member at one end including an integral spigot portion and at the opposite end an integral bell portion, said spigot portion of one pipe being positioned in said bell portion of said second pipe, a collar, said collar including a metal band having a ring of molded material therein, said collar being of less external diameter than the internal diameter of said reenforcing member, said collar being positioned in one of said pipes and protruding beyond its associated pipe, a ring member made of compressible packing material and mounted on said collar intermediate the length thereof, and a packing material positioned in the space between said collar band and said pipe reenforcing member and between the adjacent end of said pipe reenforcing member and the adjacent end of said inner layer of molded material and said ring member.

2. A conduit including two pipes positioned end to end, each of said pipes including a metal reenforcing member embedded between an outer layer of molded material and an inner layer of molded material, said metal reenforcing members being cylindrical and of uniform diameter with the adjacent ends disposed close together to form a joint, said reenforcing member at one end including a bell portion and at the opposite end a spigot portion, said spigot portion of one pipe being positioned in said bell portion of the other pipe, a collar, said collar including a metal band having a ring of molded material therein, said collar being of less external diameter than the internal diameter of said pipe reenforcing members, said collar being positioned in one of said pipes with one face thereof engaging the adjacent end of said inner layer of molded material and the opposite face thereof protruding beyond its associated pipe, a ring member on said collar intermediate the length thereof, a packing material positioned in the space between said collar and said pipe reenforcing member and between said adjacent end of said inner layer of molded material and said ring member, said bell section of said pipe reenforcing member being formed by a metal band positioned on said reenforcing member and secured thereto, said spigot section of said reenforcing member being formed by a metal band positioned in said reenforcing member and secured thereto, said spigot band including a part overlapping said joint and said bell band including a part overlapping said joint, the outer end of said spigot band protruding beyond the adjacent end of said reenforcing member and being inclined towards the axis of said pipe.

3. A conduit including two pipes positioned end to end, each of said pipes including a metal reenforcing member embedded between an outer layer of molded material and an inner layer of molded material, said reenforcing member at one end including a bell portion and at the opposite end a spigot portion, said spigot portion of one pipe being positioned in said bell portion of the other pipe, said metal reenforcing members being cylindrical and of uniform diameter with the adjacent ends disposed close together to form a joint, a collar, said collar including a metal band having a ring of molded material therein, said collar being of less external diameter than the internal diameter of said pipe reenforcing members, said collar being positioned in one of said pipes with one face thereof engaging the adjacent end of said inner layer of molded material and the opposite face thereof protruding beyond its associated pipe, a ring member on said collar intermediate the length thereof, a packing material positioned in the space between said collar and said pipe reenforcing member and between said adjacent end of said inner layer of molded material and said ring member, said bell section of said reenforcing member being formed by a metal band positioned on said pipe and secured thereto, the outer end of said bell band protruding beyond the adjacent end of said reenforcing member and being flared outwardly, said spigot section of said reenforcing member being formed by a metal band positioned in said reenforcing member and secured thereto said spigot band including a part overlapping said joint and said bell band including a part overlapping said joint.

4. A conduit including two pipes positioned end to end, each of said pipes including a metal reenforcing member embedded between an outer layer of molded material and an inner layer of molded material, said reenforcing member at one end including a bell portion and at the opposite end a spigot portion, said spigot portion of one pipe being positioned in said bell portion of the other pipe, said metal reenforcing members being cylindrical and of uniform diameter with the adjacent ends disposed close together to form a joint, a collar, said collar including a metal band having a ring of molded material therein, said collar being of less external diameter than the internal diameter of said pipe reenforcing members, said collar being positioned in one of said pipes with one face thereof engaging the adjacent end of said inner layer of molded material and the opposite face thereof protruding beyond its associated pipe, a ring member on said collar intermediate the length thereof, a packing material positioned in the space between said collar and said pipe reenforcing member and between said adjacent end of said inner layer of molded material and said ring member, said bell section of said reenforcing member being formed by a metal band positioned on said pipe and secured thereto, the outer end of said bell band protruding beyond the adjacent end of said reenforcing member and being flared outwardly, said spigot section of said reenforcing member being formed by a metal band positioned in said reenforcing member and secured thereto, said spigot band including a part overlapping said joint and said bell band including a part overlapping said joint, said spigot section engaging said ring member and extending into the packing material at one end of the ring member.

5. A conduit including two pipes positioned end to end, each of said pipes including a metal reenforcing member embedded between an outer layer of molded material and an inner layer of molded material, said reenforcing member at one end including a bell portion and at the opposite end a spigot portion, said spigot portion of one pipe being positioned in said bell portion of the other pipe, said metal reenforcing members being cylindrical and of uniform diameter with the adjacent ends disposed close together to form a joint, a collar, said collar including a metal band having a ring of molded material therein, said collar being of less external diameter than the internal diameter of said pipe reenforcing members, said collar being positioned in one of said pipes with one face thereof engaging the adjacent end of said inner layer of molded material and the opposite face thereof protruding beyond its associated pipe, a ring member on said collar intermediate the length thereof, a packing material positioned in the space between said collar and said pipe reenforcing member and between said adjacent end of said inner layer of molded material and said ring member, said bell section of said pipe reenforcing member being formed by a metal band positioned on said reenforcing member and secured thereto, said spigot section of said reenforcing member being formed by a metal band positioned in said reenforcing member and secured thereto, said spigot band including a part overlapping said joint and said bell band including a part overlapping said joint, the outer end of said spigot band protruding beyond the adjacent end of said reenforcing member and being inclined towards the axis of said pipe said collar band being of less thickness than the thickness of said spigot and bell sections of said reenforcing member.

BOZIDAR J. UKROPINA.